(12) United States Patent
Turtinen et al.

(10) Patent No.: US 9,220,122 B2
(45) Date of Patent: Dec. 22, 2015

(54) METHOD, APPARATUS AND COMPUTER PROGRAM FOR CONFIGURING DEVICE COMMUNICATIONS

(71) Applicant: Broadcom Corporation, Irvine, CA (US)

(72) Inventors: Samuli Turtinen, Ii (FI); Sami-Jukka Hakola, Kempele (FI); Timo Kalevi Koskela, Oulu (FI); Jaakko Kemppainen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 48 days.

(21) Appl. No.: 14/243,273

(22) Filed: Apr. 2, 2014

(65) Prior Publication Data

US 2014/0295829 A1 Oct. 2, 2014

(30) Foreign Application Priority Data

Apr. 2, 2013 (GB) .................................. 1305895.3

(51) Int. Cl.
*H04W 76/02* (2009.01)
*H04W 8/00* (2009.01)

(52) U.S. Cl.
CPC ............ *H04W 76/023* (2013.01); *H04W 8/005* (2013.01); *Y02B 60/50* (2013.01)

(58) Field of Classification Search
CPC ..... H04W 76/023; H04W 8/005; Y02B 60/50
See application file for complete search history.

(56) References Cited

U.S. PATENT DOCUMENTS

| | | | |
|---|---|---|---|
| 2013/0083779 A1* | 4/2013 | Ahn et al. ...................... | 370/336 |
| 2013/0109301 A1* | 5/2013 | Hakola et al. ................... | 455/39 |
| 2013/0122893 A1* | 5/2013 | Turtinen et al. ............... | 455/423 |
| 2013/0322413 A1* | 12/2013 | Pelletier et al. ............... | 370/336 |
| 2014/0094162 A1* | 4/2014 | Heo et al. .................. | 455/422.1 |
| 2014/0269558 A1* | 9/2014 | Sartori et al. ................. | 370/329 |
| 2015/0043438 A1* | 2/2015 | Fwu et al. ..................... | 370/329 |
| 2015/0208262 A1* | 7/2015 | Siomina ........................ | 370/252 |

FOREIGN PATENT DOCUMENTS

| | | |
|---|---|---|
| GB | 2497916 | 7/2013 |
| WO | 2011116815 | 9/2011 |
| WO | 2013062351 | 5/2013 |

* cited by examiner

*Primary Examiner* — Nathan Mitchell
(74) *Attorney, Agent, or Firm* — Oblon, McClelland, Maier & Neustadt, L.L.P.

(57) ABSTRACT

A set of allowed discovery cycles is stored in a radio network access node, the set consisting of a minimum discovery cycle and integer multiples thereof and each discovery cycle defining only one interval for discovery. The access node transmits in a cell an indication of a specific discovery cycle selected from the set. The access node configures at least one user equipment in the cell with a measurement gap chosen to overlap a subframe for discovery within the one interval for discovery of a different discovery cycle of the set that is in use in a neighbor cell.

20 Claims, 3 Drawing Sheets

METHOD, APPARATUS AND COMPUTER PROGRAM FOR CONFIGURING DEVICE COMMUNICATIONS

TECHNICAL FIELD

The present invention relates to a method, apparatus and a computer program for configuring device communications. The exemplary and non-limiting embodiments of this invention relate generally to wireless communication systems, methods, devices and computer programs and specific embodiments relate to coordinating among multiple cells to enable discovery by user equipment (UEs) of other devices for D2D communications or of other cells.

BACKGROUND

In a wireless communication network a UE will typically communicate with other UEs via the network. For example, a signal from one UE will be transmitted to the network and then the network will in turn transmit that signal to the proper UE recipient. However, a UE can also communicate with other UE's directly by way of device-to-device (D2D) communication. Proximity Services (ProSe) may be one of the building blocks in the progress of the 3rd Generation Partnership Project Long Term Evolution (3GPP LTE) from Release 12 onwards. ProSe entails discovery of a UE within proximity of another UE, based on direct D2D radio signals between the UEs or network side proximity detection, and an optimized communication path for UEs in proximity to one another. This can be realized by the direct communication between UEs or a local switch within the Evolved Universal Terrestrial Radio Access Network (E-UTRAN, also referred to as a LTE network).

A UE which is located near a cell edge may want to participate in device-to-device (D2D) communications with another UE. This same UE may also be in a low duty cycle to conserve its limited (battery) power supply. Such a UE could receive discovery signals from that other UE, which may be in the first UE's own cell or in an adjacent neighbour cell. A problem that arises in this scenario is enabling the UEs to find one another, which becomes more difficult in the above low duty cycle example.

DETAILED DESCRIPTION

Figure 1:
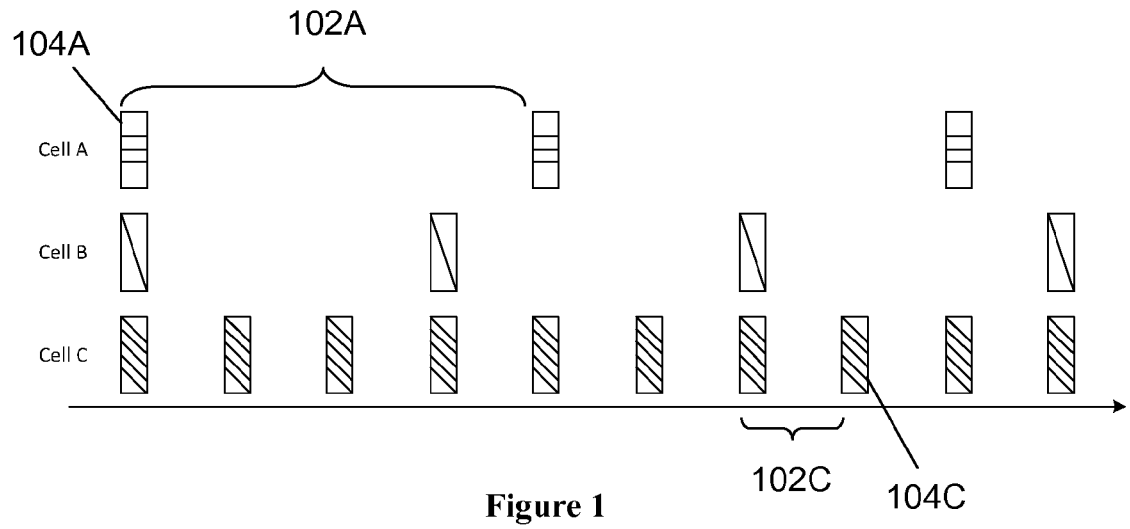
FIG. 1 is a schematic timing diagram of an example of different discovery cycles in different cells according to an exemplary embodiment of these teachings.

The examples detailed herein are in the context of a UE operating in a cell and intending to engage in device-to-device (D2D) discovery and other communications with other UEs in an LTE network. These examples are only to provide a practical context for describing the inventive concepts detailed herein; these teachings may be utilized with different radio access technologies without departing from the principles set forth herein for ensuring efficient D2D discovery. Below are described how measurement gaps can be configured to coincide with D2D intervals for discovery and cycles for such efficient D2D discovery; further background on measurement gaps can be seen at document 3GPP TS 36.331 v 11.2.0 (2013 March) and document 3GPP TS 36.133 v 11.3.1 (2013 January).

According to a first aspect of the present invention, there is provided a method comprising: storing in an access node a set of allowed discovery cycles, the set consisting of a minimum discovery cycle and integer multiples thereof and each discovery cycle defining only one interval for discovery; transmitting in a cell an indication of a specific discovery cycle selected from the set; and configuring at least one user equipment (UE) in the cell with a measurement gap chosen to overlap a subframe for discovery within the one interval for discovery of a different discovery cycle of the set that is in use in a neighbour cell.

According to a second aspect of the present invention, there is provided apparatus comprising a processing system, the processing system being configured to cause the apparatus at least to: store in an access node a set of allowed discovery cycles, the set consisting of a minimum discovery cycle and integer multiples thereof and each discovery cycle defining only one interval for discovery; transmit in a cell an indication of a specific discovery cycle selected from the set; and configure at least one user equipment (UE) in the cell with a measurement gap chosen to overlap a subframe for discovery within the one interval for discovery of a different discovery cycle of the set that is in use in a neighbour cell.

According to a third aspect of the present invention, there is provided a computer program comprising a set of computer instructions comprising code, which, when executed on a data processing system, causes the data processing system at least to: store in an access node a set of allowed discovery cycles, the set consisting of a minimum discovery cycle and integer multiples thereof and each discovery cycle defining only one interval for discovery; transmit in a cell an indication of a specific discovery cycle selected from the set; and configure at least one user equipment (UE) in the cell with a measurement gap chosen to overlap a subframe for discovery within the one interval for discovery of a different discovery cycle of the set that is in use in a neighbour cell.

Examples of embodiments of the present invention provide for enabling power efficient and low duty cycle reception by one UE of another UE's discovery messages in a manner that affects performance as little as possible, even when these two UEs are in different cells.

The set of allowed discovery cycles may be stored in a local memory of the access node.

The processing system described above may comprise at least one processor and at least one memory including computer program code.

There may be provided a computer-readable memory tangibly storing a set of computer instructions comprising code as described above.

Further features and advantages of the invention will become apparent from the following description of preferred embodiments of the invention, given by way of example only, which is made with reference to the accompanying drawings.

In one exemplary embodiment, a UE's discovery process in an LTE cell is defined so that each discovery cycle in that cell is an integer multiple of a minimum defined discovery cycle. There is a set of discovery cycles from which all cells may choose; each member of the set is an integer multiple of the shortest discovery cycle, and each discovery cycle defines one and only one interval for discovery in which the UEs know to send their own discovery messages for the case of UEs seeking to be found by other D2D UEs, and to listen for the discovery messages from other D2D UEs for the case of UEs seeking to find other D2D UEs. In another exemplary embodiment, each discovery cycle in a cell is a multiple of every shorter discovery cycle. In yet another exemplary embodiment, the granularity of the interval for discovery in each discovery cycle is defined in terms of the system frame number (SFN). In other words, an interval for discovery in one cell may occur within a certain radio frame, but this is not necessarily within the same subframe of that radio frame as the interval for discovery in an adjacent cell operating on the same or a different discovery cycle. The interval for discovery of two or more cells may occur within the same radio frame but the subframe intervals for discovery may not occur within the same subframe. In LTE the radio frame is 10 ms in length but other values can be used for deployment of these teachings in other radio access technologies. In practice, it is assumed that the radio network operators should align discovery frames between cells, for example via operations and maintenance coordination.

In another exemplary embodiment the minimum applicable discovery cycle in a cell is tied to the SFN, for example via a modulo operation. This exemplary embodiment could entail a formula known by a UE, such as SFN mod X*N=offset, where X is the minimum discovery cycle and N is a multiplier and the offset gives a desired frame adjustment. The UE would need to be notified by the network of the cell's discovery cycle and the offset value. The minimum discovery cycle would occur when N is 1 and longer discovery cycles could be represented when N is an integer greater than 1. For instance, if the minimum discovery cycle for a cell is 20 ms, the offset is 5 and N is 2, the first three discovery frames would be SFNs 45, 85, and 125. Likewise, the first six discovery frames in a neighbour cell for the minimum discovery cycle (where N is 1) would be SFNs 25, 45, 65, 85, 105, and 125. As is evident, the two cells would have the same discovery frames at SFNs 45, 85, and 125.

In one exemplary embodiment, every longer discovery cycle is tied to the minimum discovery cycle with an offset. In another exemplary embodiment, the cell indicates its discovery cycle and the offset value and the UE may derive the exact SFNs for when UE discovery takes place in the given cell.

In another exemplary embodiment, the network configures measurement gaps for the UE specifically for inter-cell/inter-frequency UE discovery. For example, the UE may want to listen for UE discovery signals from another D2D UE that is in a cell different from the listening UE's serving cell. In another exemplary embodiment, the measurement gap cycle of a cell is configured such that it is equal to the shortest discovery cycle the UE is listening to. In one exemplary embodiment, the measurement gap cycle of a cell is equal to the shortest applicable discovery cycle even though it would not be the shortest discovery cycle the UE is listening to. This may arise, for example, if some of the discovery cycles are not multiples of the shortest discovery cycle to which the UE is listening.

In one exemplary embodiment, assistance information can be sent from a UE to the network, such as to an eNB. The assistance information indicates the required measurement gap cycle the UE needs in order to listen to other UE discovery signals. In another exemplary embodiment, the UE indicates also the length of the required measurement gap. For example, this might occur if the subframe interval for discovery within the radio frame of the discovery cycle is not the same in all the cells to which the UE is listening. In one exemplary embodiment, the UE indicates the length of the required measurement gap corresponding to the offset value of the discovery occasion. This may occur if a longer measurement gap applies for a certain measurement occasion. In another exemplary embodiment, the assistance information sent from the UE includes at least one discovery range class for the UE of a plurality of discovery ranges classes it wants to discover. For example, a UE may only want to discover other UEs which are within a certain radio range class, such as UEs with a certain transmission power and modulation and coding scheme. Additionally, a UE may only want to discover other UEs within a discovery range class based on their distance, whether it be short distance or long distance, such as 100 m or 2 km. Both distance and radio range class are non-limiting examples of discovery range classes for use in practicing the exemplary embodiments of this invention.

The non-limiting exemplary embodiments above are referenced as applicable to D2D communication but this does not limit these teachings to only D2D. The exemplary embodiments above may also be utilized for small cell discovery and related areas. For example, if there is a cluster of micro/pico cells, each can use a cycle similar to the discovery cycles detailed herein for broadcasting essential connection information; UEs moving between these pico cells will then know a specific time window (the interval for discovery in the examples below) in which to listen for the neighbour cell's broadcasts.

FIG. 1 represents an exemplary illustration of different discovery cycles in different cells in which embodiments of this invention may be performed. Each block in FIG. 1 represents an interval for discovery for that particular cell. For cell A the discovery cycle is annotated as 102A and the interval for discovery within it is annotated as 104A, and similarly for cell C with discovery cycle 102C and interval for discovery 104C. The distance between the leading edge of each interval for discovery represents the cell's discovery cycle. As is evident, Cell C has the shortest applicable discovery cycle and is considered as the minimum discovery cycle that a cell may select. The discovery cycles of the Cell A and Cell B are integer multiples of the discovery cycle in Cell C, but the discovery cycle of Cell A in this example is not a multiple of the discovery cycle of Cell B. If a UE in FIG. 1 listens to only Cells A and B, or to Cells A, B and C, the UE would need a discovery cycle according to the discovery cycle of Cell C. If the UE lies in Cell C and intends to listen to UE discovery from Cell B, the UE would need a measurement gap cycle according to the discovery cycle of Cell B.

Figure 2:
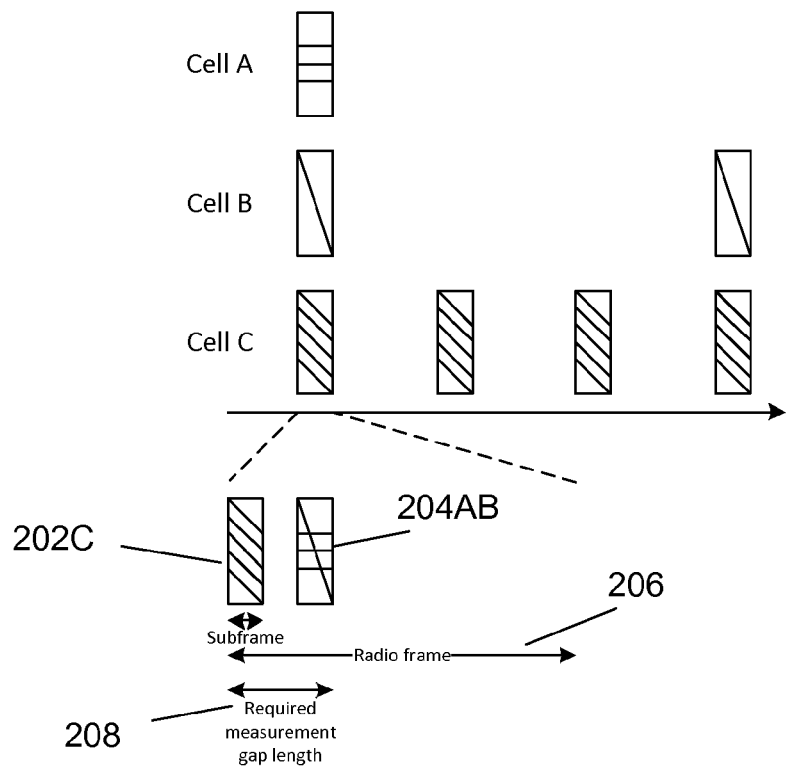
FIG. 2 is an expanded portion of FIG. 1 with additionally an illustration of a required measurement gap length according to an exemplary embodiment of these teachings.

FIG. 2 represents an exemplary illustration of the required measurement gap length in which exemplary embodiments of this invention may be performed. Each block within a row assigned to a cell represents an interval for discovery for each particular cell. Cell A, Cell B and Cell C each have the same first interval for discovery during the same radio frame. In FIG. 2, each interval for discovery is contained in a single radio frame 206. However, the subframe interval for discovery for the first discovery cycle for Cell C 202C in FIG. 2 is not in the same subframe as that of Cells A and B 204AB. The subframe interval for discovery is the subframe or subframes of a radio frame wherein a cell allows discovery signals to be transmitted or received. Accordingly, the required measurement gap length 208 is the distance between the Cell C's subframe interval for discovery and the other cells' subframe intervals for discovery. Exemplary embodiments of these teachings allow the interval for discovery for a cell to occur within a radio frame. However, when the interval for discovery of two or more cells occur during the same radio frame, the subframe interval for discovery for the cells need not occur within the same subframe of the radio frame.

Arranging the discovery cycle of neighboring cells according to exemplary embodiments as described above can enable power efficient reception of UE discovery from multiple cells, can maximize the achievable performance by a UE listening to UE discovery, and can create flexible discovery cycle configurations since not every cell includes the same amount of discovery transmitters.

Figure 3:
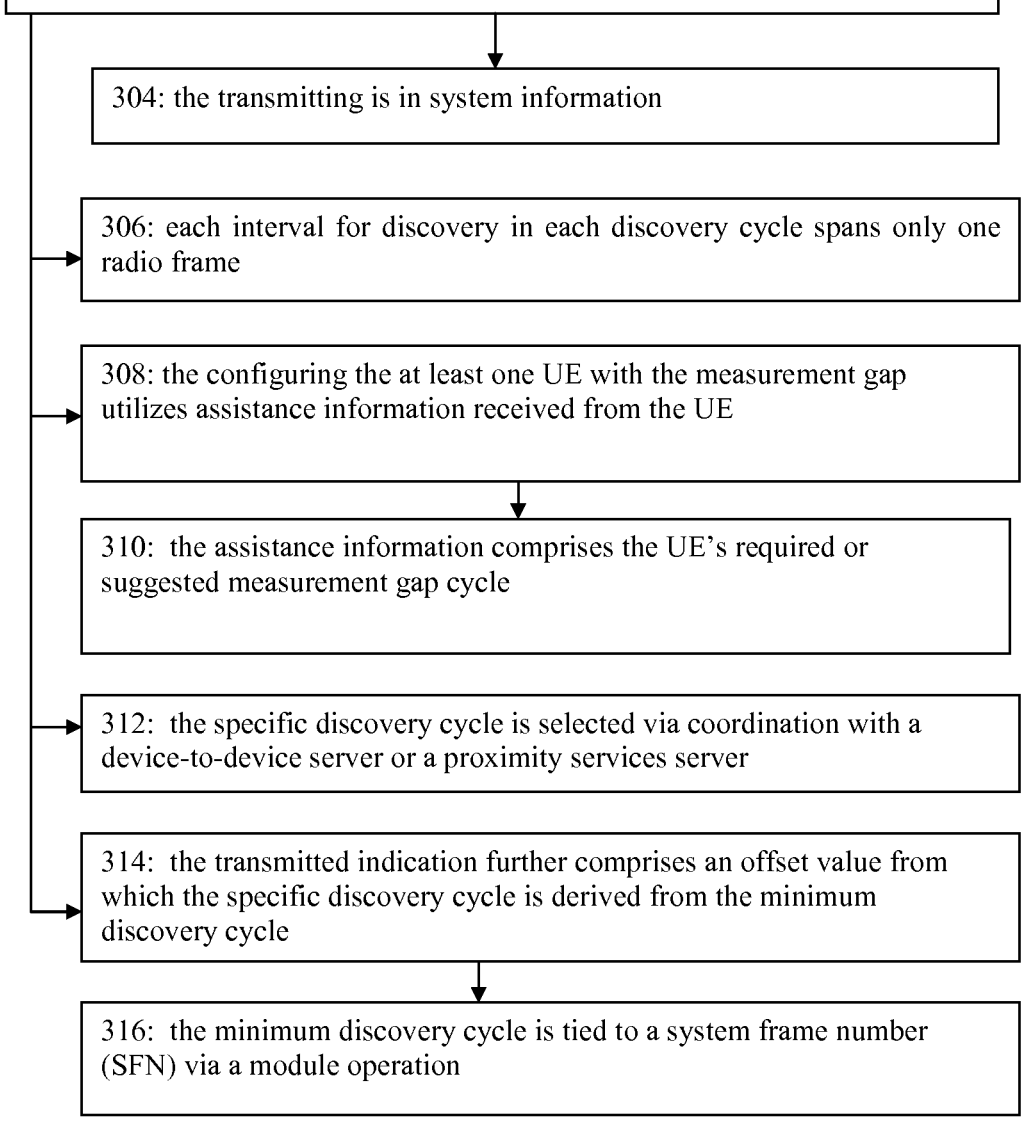
FIG. 3 is a logic flow diagram that illustrates the operation of an example of a method, a result of execution of by apparatus, and execution of computer instructions comprising code embodied on a computer readable memory, in accordance with the exemplary embodiments of this invention.

FIG. 3 presents a summary of the above teachings for operating an access node such as for example one capable of operating in a LTE or LTE-Advanced (LTE-A) or other similar radio network. At block 302 the access node stores in its local memory a set of allowed discovery cycles, the set consisting of a minimum discovery cycle and integer multiples thereof and each discovery cycle defining only one interval for discovery. The access node then transmits in its cell an indication of a specific discovery cycle selected from the set; and the access node configures at least one user equipment (UE) in the cell with a measurement gap chosen to overlap a subframe interval for discovery within the one interval for discovery of a different discovery cycle of the set that is in use in a neighbour cell. Block 304 specifies the non-limiting embodiment in which the transmitting stated at block 302 is in system information.

Some of the other non-limiting implementations detailed above are also summarized at FIG. 3 following block 304. Block 306 specifies that each interval for discovery in each discovery cycle spans only one radio frame. Block 308 of FIG. 3 specifies that configuring the at least one UE with the measurement gap as stated in block 302 utilizes assistance information received from the UE. Block 310 specifies that the assistance information of block 308 comprises the UE's required or suggested measurement gap cycle.

Block 312 states that the specific discovery cycle of block 302 is selected via coordination with a device-to-device server or a proximity services (ProSe) server. Block 314 indicates that the transmitted indication further comprises an offset value from which the specific discovery cycle is derived from the minimum discovery cycle. Block 316 specifies that the minimum discovery cycle is tied to a system frame number (SFN) via a modulo operation.

Additional non-limiting implementations of these teachings not shown in FIG. 3 also include where the at least one UE configured in the cell is a mobile phone. Another non-limiting embodiments is when the cell in which the at least one UE is configured can be a Long Term Evolution or a Long Term Evolution Advanced network. Also, an additional embodiment is when the assistance information comprises at least one discovery range class for the UE of a plurality of discovery range classes. The at least one discovery range class in one exemplary embodiment is defined by at least one of a discovery signal transmission power, discovery signal modulation and coding scheme, and geographical distance.

The logic diagram of FIG. 3 may be considered to illustrate the operation of a method, and a result of execution of a computer program stored in a computer-readable memory, and a specific manner in which components of an electronic device are configured to cause that electronic device to operate, whether such an electronic device is the access node (such as a Node B or an eNodeB, including relays and remote radio heads), or one or more components thereof such as a modem, chipset, or the like. The various blocks shown in FIG. 3 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a radio network access node, to perform the various functions summarized at FIG. 3 and (c) circuits, such as a microprocessor(s) or a portion of a microprocessor(s), that require software or firmware for operation, even if the software or firmware is not physically present. This definition of "circuitry" applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or application specific integrated circuit for a user equipment UE or for a network access node/eNB or a similar integrated circuit in a server or other network device which operates according to these teachings.

Figure 4:
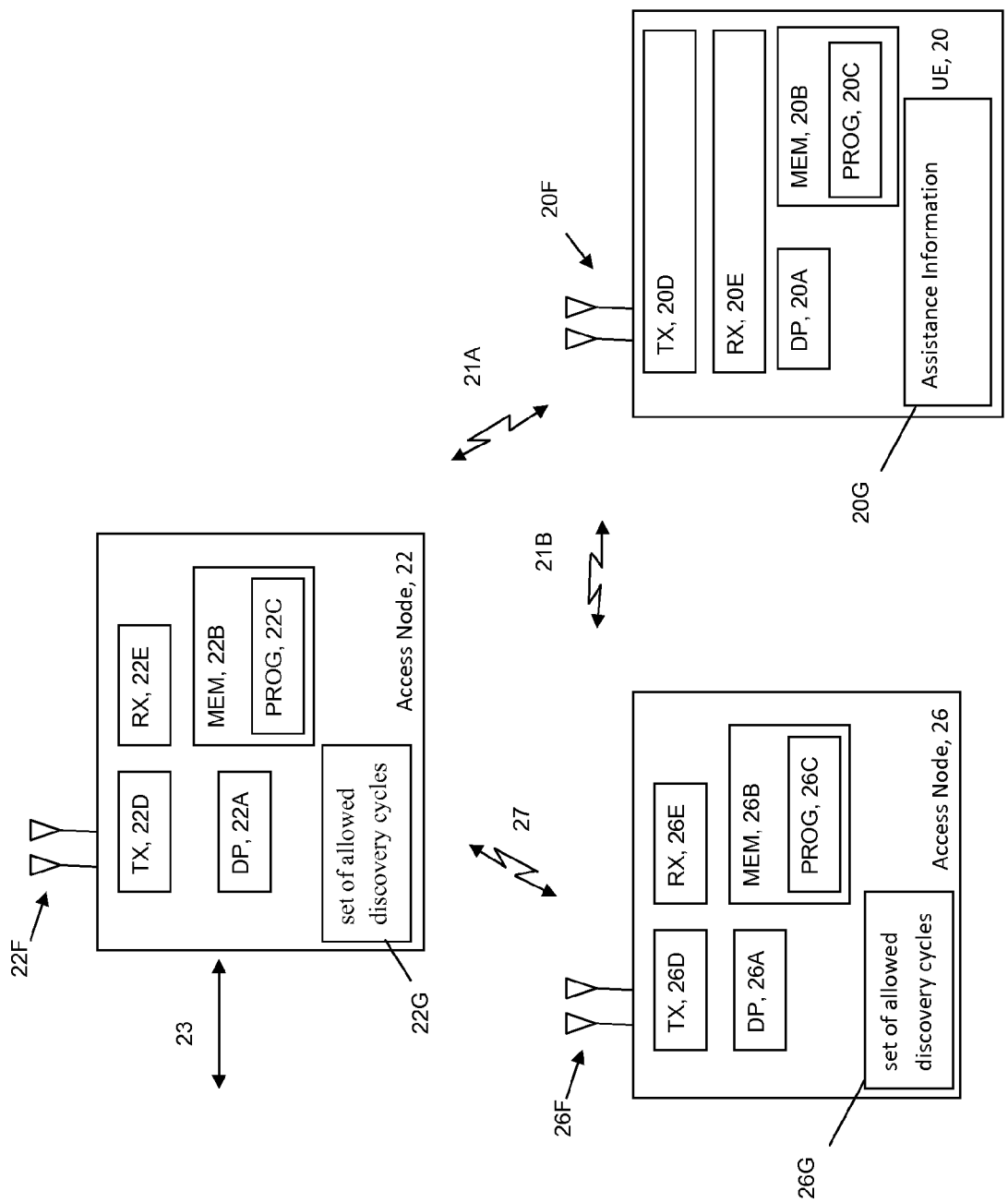
FIG. 4 is a simplified block diagram of an example of a UE in communication with two Access Nodes illustrating exemplary electronic devices suitable for use in practicing the exemplary embodiments of this invention.

Reference is now made to FIG. 4 for illustrating a simplified block diagram of various electronic devices and apparatus that are suitable for use in practicing the exemplary embodiments of this invention. In FIG. 4 an Access Node 22 is adapted for communication over a wireless link 21A with an apparatus, such as a mobile terminal or UE 20. The Access Node 22 may be any access node such as a Node B or an eNodeB (including frequency selective repeaters) of any wireless network such as LTE. The operator network of which the Access Node 22 is a part may also include a network control element such as a serving gateway SGW 24, or radio network controller RNC in the case of a UTRAN, either of which provide connectivity with the core cellular network and with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, and first communication means such as a transmitter TX 20D and a receiver RX 20E for bidirectional wireless communications with the Access Node 22 or Access Node 26. All of these wireless communications are via one or more antennas 20F. UE 20 also includes assistance information 20G for performing exemplary embodiments of these teachings.

The Access Node 22 operating in a cell also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 on a RAT via one or more antennas 22F. Access Node 22 also includes a set of allowed discovery cycles 22G. Access Node 22 is operable such that it has discovery cycles for D2D communication in accordance with the set of allowed discovery cycles.

Also in FIG. 4 is shown Access Node 26 operating on a cell different from Access Node 22. The Access Node 26 includes processing means such as at least one data processor (DP) 26A, storing means such as at least one computer-readable memory (MEM) 26B storing at least one computer program (PROG) 26C, and communication means such as a transmitter TX 26D and a receiver RX 26E for bidirectional wireless communications with the UE 20 on a RAT via one or more antennas 26F. Access Node 26 also includes a set of allowed discovery cycles 26G. Access Node 26 is operable to have a discovery cycle which is an integer multiple of the discovery cycle of Access Node 22 chosen from the set of allowed discovery cycles 26G. Access Node 26 can be configured to allow UE 20 to listen to or transmit discovery signals during Access Node 26's discovery cycle.

While not particularly illustrated for the UE 20 or either of the Access Node 22 or Access Node 26, those devices are also assumed to include as part of their wireless communicating means a modem and/or a chipset which may or may not be inbuilt onto an RF front end chip within those devices 20, 22, 26 and which also operates according to the RAT as set forth above.

At least one of the PROGs 20C in the UE 20 is assumed to include a set of program instructions that, when executed by the associated DP 20A, enable the device to operate in accordance with the exemplary embodiments of this invention, as detailed above. The Access Node 22 also has software stored in its MEM 22B to implement certain aspects of these teachings. Further, the Access Node 26 may also have implementing software to put into effect the teachings herein as detailed above. In these regards the exemplary embodiments of this invention may be implemented at least in part by computer software stored on the MEM 20B, 22B, and 26B which is executable by the DP 20A of the UE 20 and/or by the DP 22A of the Access Node 22, and/or by the DP 26A of the Access Node 26, or by hardware, or by a combination of tangibly stored software and hardware (and tangibly stored firmware) in any one or more of these devices 20, 22, 26. Electronic devices implementing these aspects of the invention need not be the entire devices as depicted at FIG. 4 or may be one or more components of same such as the above described tangibly stored software, hardware, firmware and DP, or a system on a chip SOC or an application specific integrated circuit ASIC.

In general, the various embodiments of the UE 20 can include but are not limited to personal portable digital devices having wireless communication capabilities, including but not limited to cellular and other mobile phones, navigation devices, laptop/palmtop/tablet computers, digital cameras and music devices, and Internet appliances.

Various embodiments of the computer readable MEMs 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE/LTE-A (or UTRAN), GSM and GERAN systems, as noted above the exemplary embodiments of this invention are not limited for use with only these particular types of wireless radio access technology networks.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method, the method comprising:
    storing in an access node a set of allowed discovery cycles, the set comprising a minimum discovery cycle and integer multiples of the minimum discovery cycle, wherein each discovery cycle defines one interval for discovery;
    transmitting in a cell an indication of a specific discovery cycle selected from the set; and
    configuring at least one user equipment (UE) in the cell with a measurement gap chosen to overlap a subframe for discovery within the one interval for discovery of a different discovery cycle of the set that is in use in a neighbor cell.

2. The method according to claim 1, wherein the transmitting is in system information.

3. The method according to claim 1, wherein each interval for discovery in each discovery cycle spans one radio frame.

4. The method according to claim 1, wherein the configuring the at least one UE with the measurement gap is based on assistance information received from the UE.

5. The method according to claim 4, wherein the assistance information comprises at least one of:
    the UE's required or suggested measurement gap cycle; or
    at least one discovery range class for the UE of a plurality of discovery range classes.

6. The method according to claim 5, wherein the at least one discovery range class is defined by at least one of a discovery signal transmission power, discovery signal modulation and coding scheme, or geographical distance.

7. The method according to claim 1, wherein a specific discovery cycle is selected via coordination with a device-to-device server or a proximity services server.

8. The method according to claim 1, wherein the transmitted indication comprises an offset value from which the specific discovery cycle is derived from the minimum discovery cycle.

9. The method according to claim 8, wherein the minimum discovery cycle is associated with a system frame number (SFN) via a modulo operation.

10. An apparatus comprising:
    circuitry configured to
        store a set of allowed discovery cycles, the set comprising a minimum discovery cycle and integer multiples of the minimum discovery cycle, wherein each discovery cycle defines one interval for discovery;
        transmit in a cell indication of a specific discovery cycle selected from the set; and configure at least one user equipment (UE) in the cell with a measurement gap chosen to overlap a subframe for discovery within the one interval for discovery of a different discovery cycle of the set that is in use in a neighbor cell.

11. The apparatus according to claim 10, wherein the transmitting is in system information.

12. The apparatus according to claim 11, wherein each interval for discovery in each discovery cycle spans only one radio frame.

13. The apparatus according to claim 10, wherein the configuring the at least one UE with the measurement gap is based on assistance information received from the UE.

14. The apparatus according to claim 13, wherein the assistance information comprises at least one of:
the UE's required or suggested measurement gap cycle; or
at least one discovery range class for the UE of a plurality of discovery range classes.

15. The apparatus according to claim 14, wherein the at least one discovery range class is defined by at least one of a discovery signal transmission power, discovery signal modulation and coding scheme, or geographical distance.

16. The apparatus according to claim 10, wherein a specific discovery cycle is selected via coordination with a device-to-device server or a proximity services server.

17. The apparatus according to claim 10, wherein the transmitted indication comprises an offset value from which the specific discovery cycle is derived from the minimum discovery cycle.

18. The apparatus according to claim 17, wherein the minimum discovery cycle is associated with a system frame number (SFN) via a module operation.

19. A non-transitory computer-readable memory configured to store computer instructions comprising code, which, when executed by a data processing system, cause the data processing system at least to:
store a set of allowed discovery cycles, the set comprising a minimum discovery cycle and integer multiples of the minimum discovery cycle, wherein each discovery defines only one interval for discovery;
transmit in a cell an indication of a specific discovery cycle selected from the set; and
configure at least one user equipment (UE) in the cell with a measurement gap choses to overlap a subframe for discovery within the one interval for discovery of a different discovery cycle of the set that is use in a neighbor cell.

20. The non-transitory computer-readable memory according to claim 19, wherein the transmitting is in system information.

* * * * *